US012033514B2

(12) United States Patent
Xu et al.

(10) Patent No.: US 12,033,514 B2
(45) Date of Patent: Jul. 9, 2024

(54) WAYPOINT INFORMATION TRANSMISSION METHOD, APPARATUS AND SYSTEM FOR PLATOONING

(71) Applicant: Beijing Tusen Zhitu Technology Co., Ltd., Beijing (CN)

(72) Inventors: Yong Xu, Beijing (CN); Nan Wu, Beijing (CN); Wenrui Li, Beijing (CN); Yiming Li, Beijing (CN); Qingxin Bi, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 172 days.

(21) Appl. No.: 17/653,860

(22) Filed: Mar. 7, 2022

(65) Prior Publication Data

US 2022/0189311 A1 Jun. 16, 2022

Related U.S. Application Data

(63) Continuation of application No. PCT/CN2020/113565, filed on Sep. 4, 2020.

(30) Foreign Application Priority Data

Sep. 6, 2019 (CN) .......................... 201910841326.X

(51) Int. Cl.
*H04W 4/44* (2018.01)
*B60W 30/16* (2020.01)
(Continued)

(52) U.S. Cl.
CPC ............. *G08G 1/22* (2013.01); *B60W 30/165* (2013.01); *G05D 1/0293* (2013.01);
(Continued)

(58) Field of Classification Search
CPC .............. G08G 1/22; B60W 30/165; B60W 2300/145; B60W 2556/10;
(Continued)

(56) References Cited

U.S. PATENT DOCUMENTS 6,640,164 B1 * 10/2003 Farwell ................ G05D 1/0295
701/2
2008/0125972 A1 5/2008 Neff
(Continued)

FOREIGN PATENT DOCUMENTS

CN 2013073362 A 4/2013
CN 104048672 A 9/2014
(Continued)

OTHER PUBLICATIONS

European Patent Office, Extended European Search Report for EP Appl. No. 20861536.9, mailed on Jul. 14, 2023, 8 pages.
(Continued)

*Primary Examiner* — Rodney A Butler
(74) *Attorney, Agent, or Firm* — Perkins Coie LLP

(57) ABSTRACT

A waypoint information transmission method, apparatus and system for platooning are provided. An example method for transmitting waypoint information of a platooning comprises: receiving, by an apparatus for transmitting waypoint information in real time, waypoint information of each cycle sent by a leading vehicle-mounted apparatus mounted on a leading vehicle; storing, by the apparatus, the waypoint information of each cycle, so as to form historical waypoint information; receiving, by the apparatus, a waypoint information transmission control instruction sent by the leading vehicle-mounted apparatus, and determining, according to the waypoint information transmission control instruction, target waypoint information based on the historical waypoint information; and sending, by the apparatus, the target
(Continued)

waypoint information to a first vehicle-mounted apparatus mounted on a first following vehicle that is following the leading vehicle and to be enqueued for the platooning.

20 Claims, 7 Drawing Sheets

(51) Int. Cl.
    *B60W 30/165*     (2020.01)
    *G05D 1/00*     (2006.01)
    *G05G 1/02*     (2006.01)
    *G08G 1/00*     (2006.01)

(52) U.S. Cl.
    CPC ............ *G05D 1/0295* (2013.01); *H04W 4/44* (2018.02); *B60W 2300/145* (2013.01); *B60W 2556/10* (2020.02); *B60W 2556/50* (2020.02)

(58) Field of Classification Search
    CPC ............ B60W 2556/50; G05D 1/0293; G05D 1/0295; G05D 2201/0213; H04W 4/44; H04W 4/40; G01C 21/362; G01C 21/3484; G01C 21/28
    See application file for complete search history.

(56) References Cited

U.S. PATENT DOCUMENTS

2017/0293296 A1   10/2017   Stenneth et al.
2017/0309187 A1   10/2017   Lin

FOREIGN PATENT DOCUMENTS

| CN | 104424809 | A | 3/2015 |
| CN | 106994969 | A | 8/2017 |
| CN | 107025787 | A | 8/2017 |
| CN | 107135105 | A | 9/2017 |
| CN | 107195176 | A | 9/2017 |
| CN | 107807633 | A | 3/2018 |
| CN | 108009169 | A | 5/2018 |
| CN | 108616810 | A | 10/2018 |
| CN | 108769953 | A | 11/2018 |
| CN | 108848462 | A | 11/2018 |
| CN | 109242251 | A | 1/2019 |
| CN | 110062349 | A | 7/2019 |

OTHER PUBLICATIONS

No Author. Chinese Application No. 201910841326.X, first office action mailed Nov. 28, 2022, pp. 1-7.

Hu, S.P. et al. "Dynamic Process Simulation of Ship Pilotage Risk at Harbour based on Transition Probability Model," 4th International Conference on Transportation Information and Safety (ICTIS), Aug. 8-10, 2017, Banff, Canada, pp. 1-9.

Arsian, Sibel, et al. "The Effects of OFDM Design Parameters on the V2X Communication Performance: A Survey," Vehicular Communications 7(Jan. 27, 2017) pp. 1-6.

Qin, Pinpin, et al. "Simulation of Cooperative Adaptive Cruise Control Platoon," Computer Engineering and Applications, 2020, 56(4); pp. 230-240.

\* cited by examiner ial Property Administration on Sep. 6, 2019, the content of which is incorporated herein by reference in its entirety.
WAYPOINT INFORMATION TRANSMISSION METHOD, APPARATUS AND SYSTEM FOR PLATOONING The present application is a continuation application and claims priority to International Patent Application No. PCT/CN2020/113565, titled "WAYPOINT INFORMATION TRANSMISSION METHOD, APPARATUS AND SYSTEM FOR PLATOONING", filed on Sep. 4, 2020, and which claims priority to Chinese Patent Application No. 201910841326.X, titled "WAYPOINT INFORMATION TRANSMISSION METHOD, APPARATUS AND SYSTEM FOR PLATOONING", filed to China National Intellectual Property Administration on Sep. 6, 2019, the content of which is incorporated herein by reference in its entirety.

TECHNICAL FIELD

The present application relates to the technical field of automated driving, and in particular to a method, apparatus and system for transmitting waypoint information of a platooning.

BACKGROUND

Currently, a platooning refers to a formation state in which a plurality of vehicles are in following driving at a very short distance on the basis of an automated driving technology and a Vehicle-to-Vehicle (V2V) Internet of vehicles technology. In a formation, the distance is much shorter than a safe driving distance in the general sense and is only 20 meters or even shorter. An extremely short distance will cause an airflow broken by a leading vehicle to be directly received by a second vehicle at the tail of the leading vehicle, without forming a low-pressure vortex region, so that a total air resistance value of the whole platooning in the driving process is effectively reduced. By the reduced resistance during the running in a state of the platooning, about 10% of fuel consumption can be saved. The main reason why the platooning can maintain such a short interval is the low-delay communication of V2V communication. V2V can realize communication within 100 ms from end to end. Therefore, based on the V2V technology, information interaction can be carried out between vehicles. A group of vehicles in one formation can follow a leading vehicle and carry out self-operation along with the operation of the leading vehicle. For example, if the leading vehicle is operated by stepping on an accelerator, stepping on a brake or turning, following vehicles behind can be operated in the same way in a short time.

Currently, under a platooning environment, a following vehicle generally needs to obtain waypoint information of the leading vehicle from the leading vehicle so as to meet the requirement of following the leading vehicle. However, at each time the leading vehicle transmits a waypoint, the leading vehicle will transmit entire waypoints over the past period of time for simultaneous use by all the following vehicles. The following vehicle requires a waypoint of the leading vehicle at certain time in the past, and the geographic position of the waypoint is in front of or behind the current position of the following vehicle, so that a path basis is provided for the automated driving decision of the following vehicle. As the number of following vehicles in the platooning increases, the overall physical length of the platooning is longer, and the number of historical waypoints needing to be transmitted by the leading vehicle at one time is larger, resulting in that too many communication resources are occupied and affecting the overall operation efficiency and running safety of the platooning.

SUMMARY

Embodiments of the present application provide a method, apparatus and system for transmitting waypoint information of a platooning, which can avoid the problem that communication resources of a leading vehicle are excessively occupied.

In order to achieve the above purpose, the embodiments of the present application adopt the following example implementations.

In a first aspect of an embodiment of the present application, a method for transmitting waypoint information of a platooning is provided. The method comprises: receiving, by an apparatus for transmitting waypoint information in real time, waypoint information of each cycle sent by a leading vehicle-mounted apparatus mounted on a leading vehicle; storing, by the apparatus, the waypoint information of each cycle, so as to form historical waypoint information; receiving, by the apparatus, a waypoint information transmission control instruction sent by the leading vehicle-mounted apparatus, and determining, according to the waypoint information transmission control instruction, target waypoint information based on the historical waypoint information; and sending, by the apparatus, the target waypoint information to a first vehicle-mounted apparatus mounted on a first following vehicle that is following the leading vehicle and to be enqueued for the platooning.

In a second aspect of an embodiment of the present application, an apparatus for transmitting waypoint information is provided. An apparatus for transmitting waypoint information of a platooning comprises: a receiving unit configured for receiving waypoint information of each cycle sent by a leading vehicle-mounted apparatus in real time, the leading vehicle-mounted apparatus mounted on a leading vehicle; a storage configured for storing the waypoint information of each cycle and forming historical waypoint information; a determination unit configured for receiving a waypoint information transmission control instruction from the leading vehicle-mounted apparatus and determining, according to the waypoint information transmission control instruction, target waypoint information based on the historical waypoint information; and a sending unit configured for sending the target waypoint information to a first vehicle-mounted apparatus mounted on a first following vehicle that is following the leading vehicle and to be enqueued for the platooning.

In a third aspect of an embodiment of the present application, a system for transmitting waypoint information of a platooning is provided. The system comprises a leading vehicle-mounted apparatus mounted on a leading vehicle and configured for sending, to an apparatus for transmitting waypoint information, waypoint information of a current cycle and a waypoint information transmission control instruction; a first vehicle-mounted apparatus mounted on a following vehicle to be enqueued, the following vehicle following the leading vehicle; and an apparatus for transmitting waypoint information configured for receiving the waypoint information of each cycle in real time and storing the waypoint information of each cycle so as to form historical waypoint information, and wherein the apparatus for transmitting waypoint information is further configured for determining, according to the waypoint information transmission control instruction, target waypoint information based on the historical waypoint information, and sending the target waypoint information to the first vehicle-mounted apparatus.

In a fourth aspect of an embodiment of the present application, a computer-readable storage medium is provided, comprising a program or an instruction. The program or the instruction, when operated on a computer, implements the method for transmitting waypoint information of a platooning as described in the first aspect above.

In a fifth aspect of an embodiment of the present application, a computer program product comprising an instruction is provided. The computer program product, when operated on a computer, causes the computer to execute the method for transmitting waypoint information of a platooning as described in the first aspect above.

In a sixth aspect of an embodiment of the present application, a chip system is provided, comprising a processor. The processor is coupled to a memory, and the memory stores a program instruction. The program instruction stored in the memory, when executed by the processor, implements the method for transmitting waypoint information of a platooning as described in the first aspect above.

In a seventh aspect of an embodiment of the present application, a circuitry is provided, comprising a processing circuit configured to implement the method for transmitting waypoint information of a platooning as described in the first aspect above.

In an eighth aspect of an embodiment of the present application, a computer server is provided, comprising a memory, and one or more processors communicatively connected to the memory.

The memory stores instructions executable by the one or more processors. The instructions, when executed by the one or more processors, cause the one or more processors to implement the method for transmitting waypoint information of a platooning as described in the first aspect above.

The embodiments of the present application provide a method, apparatus and system for transmitting waypoint information of a platooning. The apparatus for transmitting waypoint information receives, in real time, waypoint information of each cycle sent by the leading vehicle-mounted apparatus, stores the waypoint information of each cycle, so as to form historical waypoint information, receives a waypoint information transmission control instruction sent by the leading vehicle-mounted apparatus, determines, according to the waypoint information transmission control instruction, target waypoint information from the historical waypoint information, and sends the target waypoint information to the first vehicle-mounted apparatus. It is thus clear that the waypoint information of each cycle of the leading vehicle in the embodiments of the present application is stored and maintained by the apparatus for transmitting waypoint information alone. If there is a following vehicle to be enqueued, the apparatus for transmitting waypoint information is used for determining the target waypoint information and sending it to the first vehicle-mounted apparatus of the following vehicle to be enqueued, and the leading vehicle-mounted apparatus only sends less waypoint information at each cycle, instead of sending a mass of waypoint information if there is a following vehicle to be enqueued, thus saving the communication resources of the leading vehicle, and the problem that the communication resources of the leading vehicle are excessively occupied can be avoided.

BRIEF DESCRIPTION OF THE DRAWINGS

In order to more clearly illustrate embodiments of the present application or the technical solutions in the prior art, the drawings required for use in the embodiments will be briefly described below. It is obvious that the drawings in the description below are only some embodiments of the present application, and other drawings can be derived from these drawings by those of ordinary skills in the art without making creative efforts.

DETAILED DESCRIPTION

Figure 1:
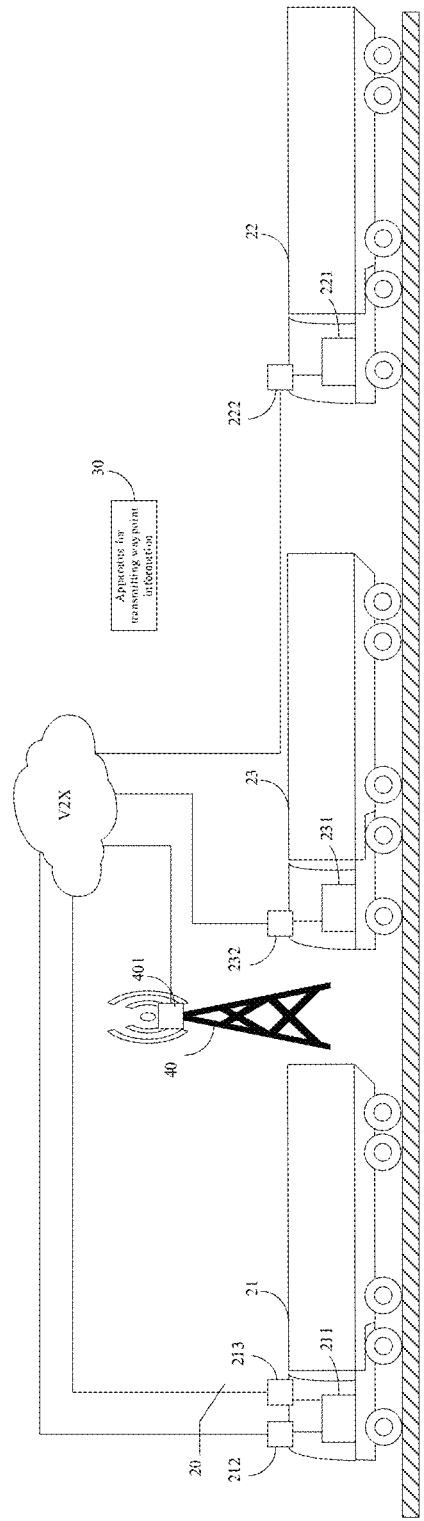
FIG. 1 is a schematic structural diagram I of a system for transmitting waypoint information of a platooning according to an embodiment of the present application.

The technical solutions in the embodiments of the present application will be described below with reference to the accompanying drawings in the embodiments of the present application. Obviously, the described embodiments are examples only and the disclosed technology is not limited thereto.

It should be noted that the terms "first", "second", etc. in the specification and claims of the present application and the above drawings are used to distinguish similar objects, and do not have to be used to describe a specific order or sequence. It should be understood that the data used in this way can be interchanged under appropriate circumstances for the purposes of the embodiments of the present application described herein. Moreover, the terms "comprise" and "have" and any variations thereof are intended to cover non-exclusive inclusion. For example, a process, method, system, product or apparatus comprising a series of steps or units is not necessarily limited to the explicitly listed steps or units, but may comprise other steps or units that are not explicitly listed or are inherent in the process, method, system, product or device.

In order to make the present application better understood by those skilled in the art, some technical terms appearing in the embodiments of the present application are explained below:

V2V: Vehicle-to-Vehicle. A V2V communication technology is a communication technology that is not limited to a fixed base station, and provides direct end-to-end wireless communication for moving vehicles.

V2X: Vehicle to X. It is a key technology of a future intelligent transportation system. It enables communication from vehicle to vehicle, vehicle to base station, and base station to base station. Therefore, a series of traffic information such as real-time road conditions, road information and pedestrian information is obtained, so that the driving safety is improved; the congestion is reduced; the traffic efficiency is improved; and vehicle-mounted entertainment information is provided.

RSU: Road Side Unit or also called a road side device. It is installed on the road side and communicating with an on-board unit (OBU).

In some embodiments of the present application, the term "vehicle" is to be interpreted broadly to include any moving object, including, for example, an aircraft, a watercraft, a spacecraft, an automobile, a truck, a van, a semi-trailer, a motorcycle, a golf cart, an off-road vehicle, a warehouse transportation vehicle or a farm vehicle, and a transportation vehicle that travels on rails, such as a tram or a train, and other rail vehicles. The "vehicle" in the present application may generally comprise: a power system, a sensor system, a control systems, peripherals, and a computer system. In other embodiments, the vehicle may comprise more, fewer, or different systems.

The power system is a system for providing power motion for a vehicle, comprising an engine/motor, a transmission and wheels/tires, and an energy unit.

The control system may comprise a combination of apparatuses controlling the vehicle and its components, such as a steering unit, a throttle valve, and a brake unit.

The peripherals may be devices that allow the vehicle to interact with external sensors, other vehicles, external computing devices, and/or users, such as a wireless communication system, a touch screen, a microphone, and/or a speaker.

Based on the vehicle described above, a sensor system and an unmanned control apparatus are also provided in an unmanned vehicle.

The sensor system may comprise a plurality of sensors for sensing information of an environment in which the vehicle is located, and one or more actuators for changing positions and/or orientations of the sensors. The sensor system may comprise any combination of sensors such as a global positioning system sensor, an inertial measurement unit, a radio detection and ranging (RADAR) unit, a camera, a laser rangefinder, a light detection and ranging (LIDAR) unit, and/or an acoustic sensor. The sensor system may also comprise sensors that monitor internal systems of the vehicle (e.g., an $O_2$ monitor, a fuel gauge, and an engine thermometer).

The unmanned control apparatus may comprise one processor and memory. The memory stores therein at least one machine-executable instruction. The processor executes the at least one machine-executable instruction to implement functions including a map engine, a positioning module, a sensing module, a navigation or routing module, an automatic control module, and the like. The map engine and the positioning module are used for providing map information and positioning information. The sensing module is used for sensing, according to the information acquired by the sensor system and the map information provided by the map engine, things in the environment where the vehicle is located. The navigation or routing module is used for planning a driving path for the vehicle according to the processing results of the map engine, the positioning module, and the sensing module. The automatic control module inputs, analyzes and converts decision information of the module such as the navigation or routing module into a control command for a vehicle control system, outputs the control command, and sends the control command to a corresponding component in the vehicle control system through a vehicle-mounted network (for example, an in-vehicle electronic network system which is achieved through a controller area network (CAN) bus, a local area Internet, a multimedia directional system, and the like), so as to achieve automatic control for the vehicle. The automatic control module can also acquire information of all components in the vehicle through the vehicle-mounted network.

Currently, in an advancing process of a platooning, a leading vehicle needs to regularly communicate with each following vehicle in the platooning through V2X and send a current kinematic state of the leading vehicle, including one or more information of a leading vehicle position, a leading vehicle speed, a leading vehicle acceleration, a leading vehicle course, a steering angle of a front wheel of the leading vehicle, an opening degree of an accelerator of the leading vehicle, a depth of a brake pedal of the leading vehicle, a braking deceleration of the leading vehicle, and a rotating angle of a steering wheel of the leading vehicle. All the information in the above-mentioned kinematic state of the leading vehicle at each moment forms one piece of complete waypoint information. A following vehicle receives and stores the waypoint information of the leading vehicle. A storage unit of the following vehicle may store the waypoint information of the leading vehicle in the past period of time, and may control the following vehicle to run according to the waypoint information.

As can be seen, the current waypoint information of each following vehicle needs to be sent by the leading vehicle through the V2X communication. However, in the platooning, a V2X communication channel of the leading vehicle is busy in completing the tasks. For example, the leading vehicle also needs to receive feedback information of the following vehicles of the whole platooning in real time in addition to sending its waypoint information through the V2X communication channel, so as to know the state of the whole platooning. In addition, the leading vehicle may also communicate with other platoonings. In addition, the leading vehicle also needs to control the platooning in time (otherwise, an accident may occur) when it finds that the state of the platooning is abnormal. Therefore, V2X channel resources occupied by the leading vehicle for sending its own waypoint information are as less as possible.

In order to solve the above problems, an embodiment of the present application provides a system for transmitting waypoint information of a platooning. One example system for transmitting waypoint information of a platooning is shown in FIG. 1, which comprises a leading vehicle-mounted apparatus 211 of a leading vehicle 21 in a platooning 20, a first vehicle-mounted apparatus 221 of a following vehicle 22 to be enqueued, and an apparatus 30 for transmitting waypoint information. In addition, in the system for transmitting waypoint information of a platooning, the leading vehicle 21 in the platooning 20 may also be provided with a leading vehicle-mounted V2X device 212 and a leading vehicle redundant vehicle-mounted V2X device 213. The following vehicle to be enqueued 22 may also be provided with a first vehicle-mounted V2X device 222. In addition, the system for transmitting waypoint information of a platooning may further comprise a second vehicle-mounted apparatus 231 and a second vehicle-mounted V2X device 232 of a following vehicle 23 that has been queued in the platooning, and may further comprise a road side V2X device 401 at a road side unit (RSU) 40 of a road where the platooning 20 runs. The leading vehicle-mounted apparatus 211 of the leading vehicle 21 is connected to the leading vehicle-mounted V2X device 212 and the leading vehicle redundant vehicle-mounted V2X device 213, respectively. The second vehicle-mounted apparatus 231 is connected to the second vehicle-mounted V2X device 232, and the first vehicle-mounted apparatus 221 is connected to the first vehicle-mounted V2X device 222. In addition, every two of the leading vehicle-mounted V2X device 212, the leading vehicle redundant vehicle-mounted V2X device 213, the road side V2X device 401, the second vehicle-mounted V2X device 232 and the first vehicle-mounted V2X device 222 may be communicatively connected, that is, they can communicate with each other through a V2X technology.

It is noted that the first vehicle-mounted apparatus 221, the second vehicle-mounted apparatus 231 and the leading vehicle-mounted apparatus 211 in the present application may be a vehicle-mounted computer or a vehicle-mounted server having computational processing capacity.

The RSU 40 in the present application may be a road side sensing device carrying a laser radar, a camera, a communication module, and the like. A specific structure and detailed content of the RSU 40 may refer to the Chinese Patent Application No. CN107807633A, and details will not be described herein again.

Figure 2:
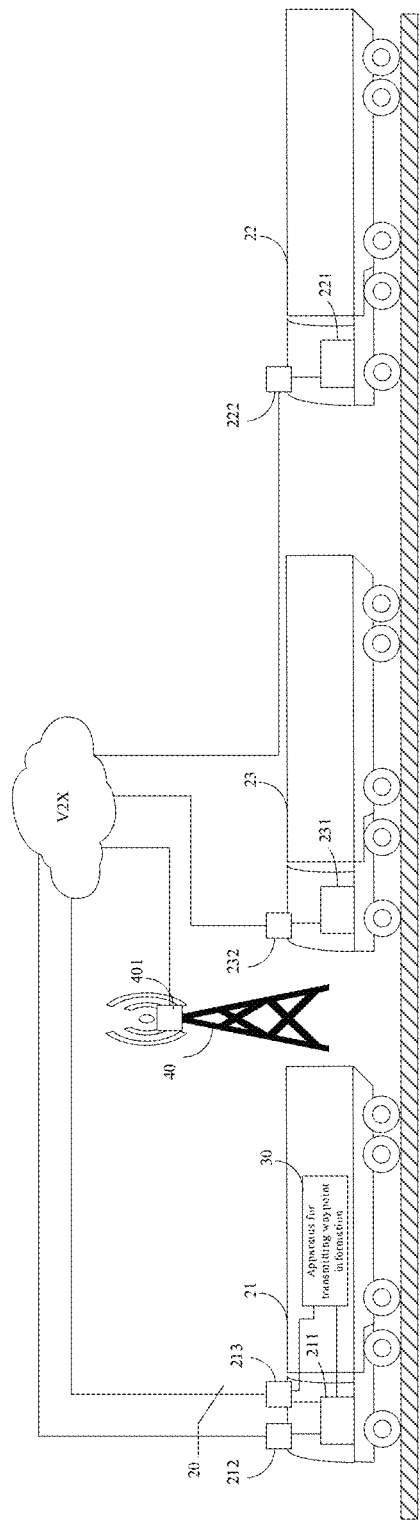
FIG. 2 is a schematic structural diagram II of a system for transmitting waypoint information of a platooning according to an embodiment of the present application.
Figure 3:
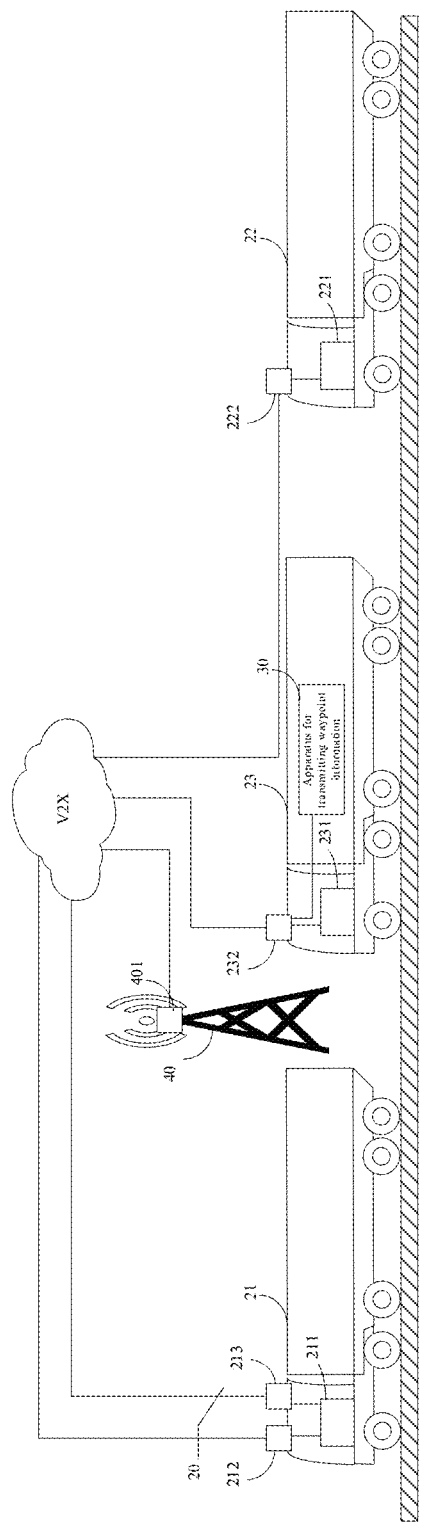
FIG. 3 is a schematic structural diagram III of a system for transmitting waypoint information of a platooning according to an embodiment of the present application.
Figure 4:
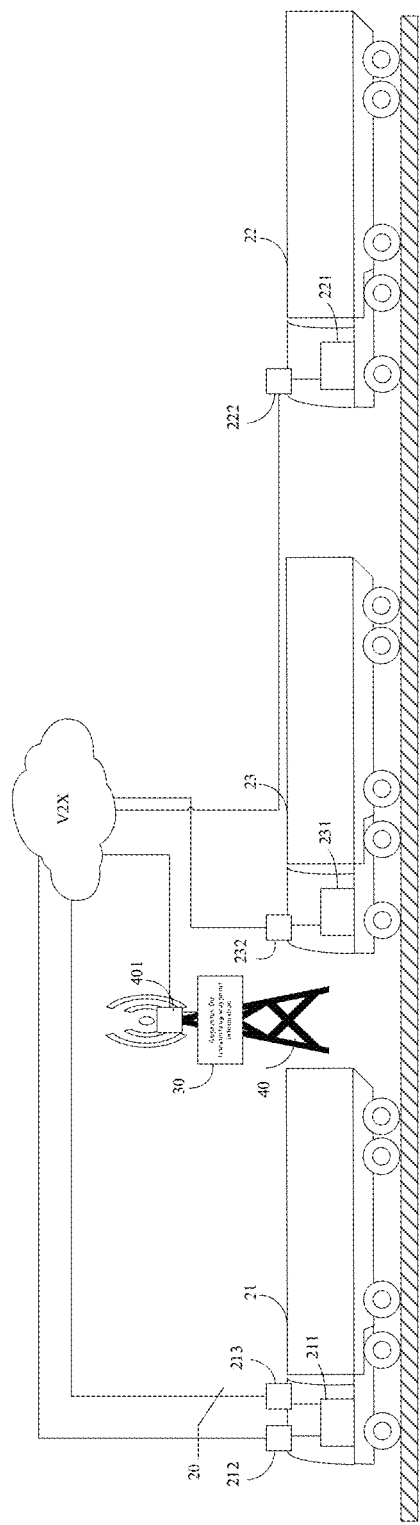
FIG. 4 is a schematic structural diagram IV of a system for transmitting waypoint information of a platooning according to an embodiment of the present application.

In addition, respectively as shown in FIG. 2, FIG. 3, and FIG. 4, the apparatus 30 for transmitting waypoint information may be arranged on the leading vehicle 21 (as shown in FIG. 2). For example, the apparatus 30 for transmitting waypoint information is an apparatus independently arranged on the leading vehicle 21. The apparatus 30 for transmitting waypoint information is communicatively connected to the leading vehicle-mounted apparatus 211, or the apparatus 30 for transmitting waypoint information may be the leading vehicle-mounted apparatus 211 itself. In addition, the apparatus 30 for transmitting waypoint information may be further arranged on any following vehicle (as shown in FIG. 3) in the platooning 20. For example, in order to facilitate the communicative interaction with the following vehicle to be enqueued 22 close to the tail of the platooning, the apparatus 30 for transmitting waypoint information may be arranged on the following vehicle 23 at the tail of the platooning 20, and the apparatus 30 for transmitting waypoint information is connected to the second vehicle-mounted V2X device 232. In addition, the apparatus 30 for transmitting waypoint information may be further arranged on the RSU 40 of the road where the platooning 20 runs (as shown in FIG. 4), and the apparatus 30 for transmitting waypoint information is connected to the road side V2X device 401.

In one embodiment of the present application, the leading vehicle-mounted apparatus 211 is configured for sending waypoint information of a current cycle to the apparatus 30 for transmitting waypoint information in real time.

The apparatus 30 for transmitting waypoint information is configured for receiving the waypoint information of each cycle in real time, and storing the waypoint information of each cycle, so as to form historical waypoint information.

The leading vehicle-mounted apparatus 211 is further configured for sending a waypoint information transmission control instruction to the apparatus 30 for transmitting waypoint information.

The apparatus 30 for transmitting waypoint information is further configured for determining, according to the waypoint information transmission control instruction, target waypoint information from the historical waypoint information, and sending the target waypoint information to the first vehicle-mounted apparatus 221.

In one embodiment of the present application, the leading vehicle-mounted apparatus 211 sends the waypoint information of the current cycle to the apparatus 30 for transmitting waypoint information in real time. The number of pieces of waypoint information of each cycle may be the same. For example, the waypoint information of 10 waypoints is sent in each cycle (if the leading vehicle-mounted apparatus 211 sends the waypoint information at a frequency of 20 Hz, one cycle is 50 ms), but it is not limited to this. In addition, the waypoint information comprises a leading vehicle position and one or more pieces of the following information: for example, a leading vehicle speed, a leading vehicle acceleration, a leading vehicle course, a steering angle of a front wheel of the leading vehicle, an opening degree of an accelerator of the leading vehicle, a depth of a brake pedal of the leading vehicle, a braking deceleration of the leading vehicle, and a rotating angle of a steering wheel of the leading vehicle. In this way, each following vehicle 23 in the platooning and the following vehicle 22 to be enqueued may be controlled, according to the waypoint information, to follow the movement. The following vehicle in the platooning 20 controls its running according to the waypoint information here, and details will not be described herein again.

In one embodiment of the present application, since the cycle of the leading vehicle-mounted apparatus 211 for sending the waypoint information may be shorter, such as 50 ms, if the leading vehicle has a low speed, there may possibly be a situation that two pieces of waypoint information sent by the leading vehicle-mounted apparatus 211 have lots of repetitions. Therefore, the apparatus 30 for transmitting waypoint information receives the waypoint information of each cycle in real time and stores the same, so as to form the historical waypoint information. In this process, the waypoint information of each cycle needs to be subjected to deduplication processing, and the waypoint information of each cycle after the deduplication processing is stored to form the historical waypoint information. The process of the deduplication processing may be implemented in two methods:

For example, Method I:

The apparatus 30 for transmitting waypoint information obtains a leading vehicle position corresponding to the waypoint information of the current cycle when it receives the waypoint information of the current cycle. The leading vehicle position corresponding to the waypoint information of the current cycle is compared with the leading vehicle position corresponding to the waypoint information that has been stored to form a position comparison result. The waypoint information having the position comparison result less than or equal to a preset position deviation threshold is determined as repeated waypoint information. The repeated waypoint information is deleted from the waypoint information of the current cycle, and the remaining waypoint information of the current cycle after the deletion of the repeated waypoint information is stored to form the historical waypoint information. For example, the apparatus 30 for transmitting waypoint information receives the waypoint information of 10 waypoints in each cycle (if the leading vehicle-mounted apparatus 211 sends the waypoint information at the frequency of 20 Hz, one cycle is 50 ms), and the distance of each waypoint is theoretically 1 meter. If the position comparison result between the leading vehicle position corresponding to the waypoint information of the current cycle and the leading vehicle position corresponding to the waypoint information that has been stored is less than or equal to the preset position deviation threshold (such as 50 centimeters), it can be considered that the waypoint information of the current cycle is the repeated waypoint information.

For another example, Method II:

The apparatus 30 for transmitting waypoint information obtains a waypoint information serial number corresponding to the waypoint information of the current cycle if it receives the waypoint information of the current cycle (the waypoint information here comprises the waypoint information serial number, and the same waypoint information has the same waypoint information serial numbers). The waypoint information serial number corresponding to the waypoint information of the current cycle is compared with the waypoint information serial number corresponding to the waypoint information that has been stored to form a serial number comparison result. The waypoint information having the same serial number comparison result is determined as repeated waypoint information. The repeated waypoint information is deleted from the waypoint information of the current cycle, and the remaining waypoint information of the current cycle after the deletion of the repeated waypoint information is stored to form the historical waypoint information. For example, the apparatus 30 for transmitting waypoint information receives the waypoint information of 10 waypoints in each cycle (if the leading vehicle-mounted apparatus 211 sends the waypoint information at the frequency of 20 Hz, one cycle is 50 ms), and a distance of each waypoint is theoretically 1 meter. The waypoint information at the same position has the same serial numbers. For example, if the waypoint information that has been stored is waypoint information Nos. 001, 002 and 003, and the waypoint information of the current cycle is waypoint information Nos. 002, 003 and 004, it can be determined that the waypoint information Nos. 002 and 003 are the repeated waypoint information.

In one embodiment of the present application, the leading vehicle-mounted apparatus 211 may receive an enqueuing request sent by the first vehicle-mounted apparatus 221 of the following vehicle to be enqueued 22. After the leading vehicle-mounted apparatus 211 determines that the following vehicle to be enqueued 22 can be enqueued, the leading vehicle-mounted apparatus may send a waypoint information transmission control instruction to the apparatus 30 for transmitting waypoint information, so as to control the apparatus 30 for transmitting waypoint information to determine, according to the waypoint information transmission control instruction, target waypoint information from the historical waypoint information and send the target waypoint information to the first vehicle-mounted apparatus 221 of a following vehicle allowed to be enqueued (i.e., the following vehicle to be enqueued 22).

In one embodiment of the present application, the waypoint information transmission control instruction comprises a current position of the following vehicle to be enqueued and a current position of the leading vehicle. The apparatus 30 for transmitting waypoint information may determine, according to the waypoint information transmission control instruction, the target waypoint information from the historical waypoint information by the following method:

The apparatus 30 for transmitting waypoint information receives the waypoint information transmission control instruction sent by the leading vehicle-mounted apparatus 211 and obtains, according to the current position of the following vehicle to be enqueued in the waypoint information transmission control instruction, the target waypoint information between the current position of the following vehicle to be enqueued and the current position of the leading vehicle from the historical waypoint information. For example, the historical waypoint information stored in the apparatus 30 for transmitting waypoint information is that one piece of waypoint information exists every 1 meter. In the current cycle, if a distance obtained between the current position of the following vehicle to be enqueued and the current position of the leading vehicle is 100 m, 100 pieces of target waypoint information corresponding to the 100 meters need to be obtained from the historical waypoint information. The above only describes an obtaining method for the enumerated target waypoint information, but it is not limited to this.

In one embodiment of the present application, the method where the apparatus 30 for transmitting waypoint information receives the waypoint information of each cycle in real time, and the apparatus 30 for transmitting waypoint information sends the target waypoint information to the first vehicle-mounted apparatus 221 may be different since the position of the apparatus 30 for transmitting waypoint information is different. For example:

Method I: as shown in FIG. 2, the apparatus 30 for transmitting waypoint information is arranged on the leading vehicle 21, so that the apparatus 30 for transmitting waypoint information may be communicatively connected to the leading vehicle-mounted apparatus 211 and receives the waypoint information of each cycle in real time from the leading vehicle-mounted apparatus 211. In addition, the apparatus 30 for transmitting waypoint information may send the target waypoint information to the first vehicle-mounted apparatus 221 through the leading vehicle redundant vehicle-mounted V2X device 213 and the first vehicle-mounted V2X device 222. In Method I, the leading vehicle redundant vehicle-mounted V2X device 213 is used to transmit the target waypoint information, and the leading vehicle-mounted V2X device 212 is used for carrying out more important tasks: sending the control instruction, receiving feedback information of the following vehicles of the whole platooning, and firstly publishing communication data of communication with other platoonings, thus avoiding the occupation of the communication resources of the leading vehicle-mounted V2X device 212 by the transmission of the target waypoint information.

Method II: as shown in FIG. 3, the apparatus 30 for transmitting waypoint information is arranged on any following vehicle in the platooning 20. For example, the apparatus 30 for transmitting waypoint information is arranged on the following vehicle 23 at the tail of the platooning 20 (in FIG. 3, the platooning 20 comprising the leading vehicle 21 and one following vehicle 23 is taken as an example only, but it is not limited to this). The apparatus 30 for transmitting waypoint information receives, through the second vehicle-mounted V2X device 232 in real time, the waypoint information of each cycle sent by the leading vehicle-mounted apparatus 211 through the leading vehicle-mounted V2X device 212 (of course, the leading vehicle redundant vehicle-mounted V2X device 213 may also be used). In addition, the apparatus 30 for transmitting waypoint information may send the target waypoint information to the first vehicle-mounted apparatus 221 through the second vehicle-mounted V2X device 232 and the first vehicle-mounted V2X device 222.

Method III: as shown in FIG. 4, the apparatus 30 for transmitting waypoint information may be arranged on the RSU 40 of the road where the platooning 20 runs. The apparatus 30 for transmitting waypoint information may receive, through the road side V2X device 401 in real time, the waypoint information of each cycle sent by the leading vehicle-mounted apparatus 211 through the leading vehicle-mounted V2X device 212. In addition, the apparatus 30 for transmitting waypoint information may send the target waypoint information to the first vehicle-mounted apparatus 221 through the road side V2X device 401 and the first vehicle-mounted V2X device 222.

It can be seen that via the above-mentioned three different methods, the apparatus 30 for transmitting waypoint information may be flexibly arranged at multiple positions, and there are many methods to implement this. In this way, each following vehicle may obtain complete waypoint information of the leading vehicle at extremely low communication cost, so that under the guidance of the complete waypoint information, following control of the platooning is achieved.

Figure 5:
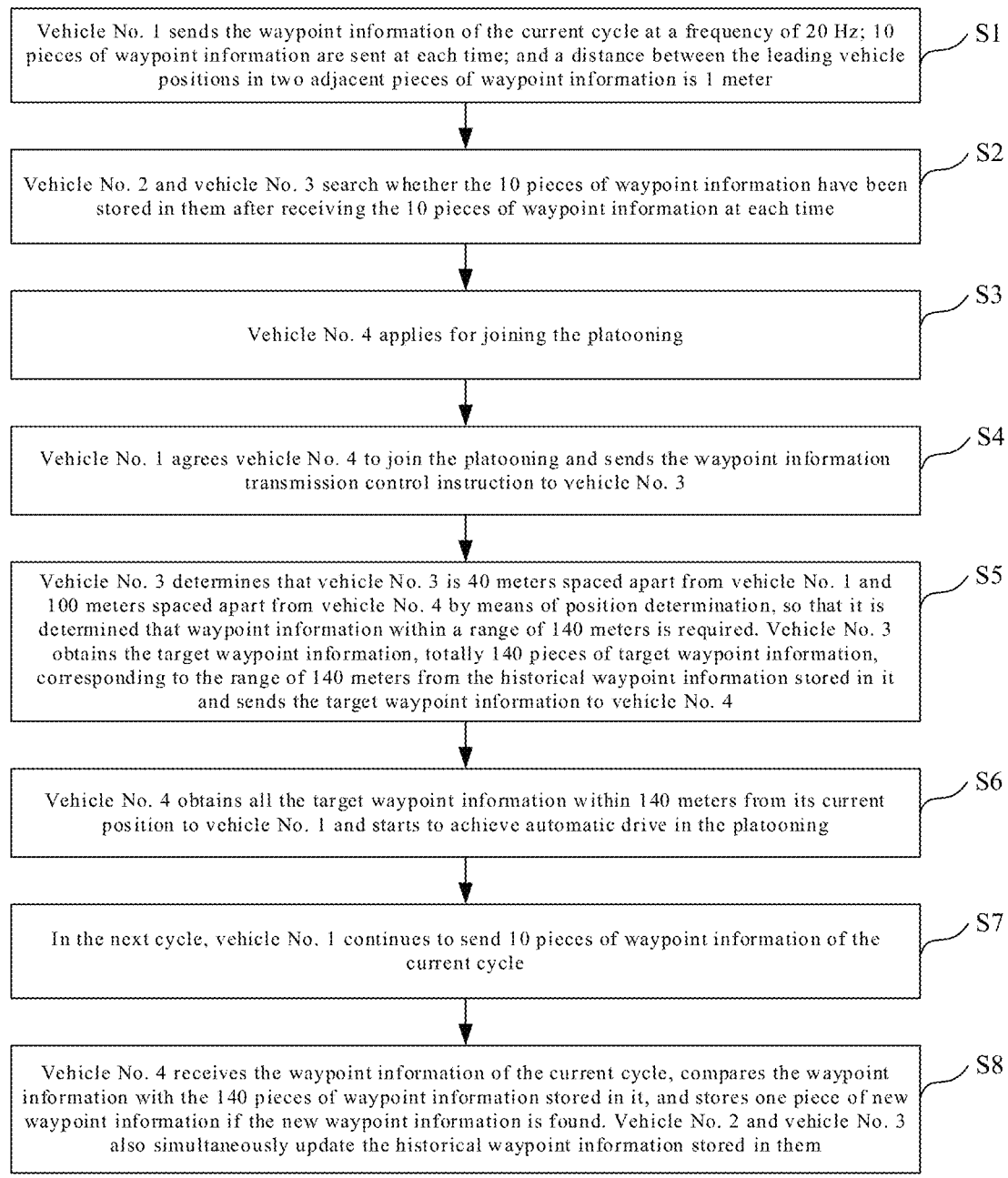
FIG. 5 is a flowchart of a specific application example of a system for transmitting waypoint information of a platooning in an embodiment of the present application.

One example application of the system for transmitting waypoint information of a platooning in the embodiment of the present application is enumerated below. There are 3 vehicles in the platooning. No. 1 represents a leading vehicle, and No. 2 and No. 3 represent following vehicles. A vehicle distance is 20 meters. The platooning is in an automated driving state. Vehicle No. 4 is a new following vehicle to be enqueued, which is 100 meters spaced apart from vehicle No. 3. (In the interaction process here, only the leading vehicle, the following vehicles, etc. are taken as execution bodies, and the details on the vehicle such as the vehicle-mounted apparatuses and the vehicle-mounted V2X devices are omitted. This example is only a specific application example, and those skilled in the art can also enumerate more application examples on the basis of the specification of the present application, and enumeration will not be made here.) As shown in FIG. 5, the following is included:

At step S1, vehicle No. 1 sends the waypoint information of the current cycle at a frequency of 20 Hz. 10 pieces of waypoint information are sent at each time, and a distance between the leading vehicle positions in two adjacent pieces of waypoint information is 1 meter.

At step S2, vehicle No. 2 and vehicle No. 3 search whether the 10 pieces of waypoint information have been stored in them after receiving the 10 pieces of waypoint information at each time.

For example, vehicle No. 2 does not receive the waypoint information of the leading vehicle in the last cycle, so that two pieces of waypoint information are added in this update, while vehicle No. 3 receives the waypoint information of the leading vehicle in the last cycle, so that one piece of waypoint information is added in this update. By means of update, vehicle No. 2 and vehicle No. 3 both have the complete waypoints of vehicle No. 1.

At step S3, vehicle No. 4 applies for joining the platooning.

At step S4, vehicle No. 1 agrees vehicle No. 4 to join the platooning and sends the waypoint information transmission control instruction to vehicle No. 3.

At step S5, vehicle No. 3 determines that vehicle No. 3 is 40 meters spaced apart from vehicle No. 1 and 100 meters spaced apart from vehicle No. 4 by means of position determination, so that it is determined that waypoint information within a range of 140 meters is required. Vehicle No. 3 obtains the target waypoint information, totally 140 pieces of target waypoint information, corresponding to the range of 140 meters from the historical waypoint information stored in it and sends the target waypoint information to vehicle No. 4.

At step S6, vehicle No. 4 obtains all the target waypoint information within 140 meters from its current position to vehicle No. 1 and starts to achieve automatic drive in the platooning.

At step S7, in the next cycle, vehicle No. 1 continues to send 10 pieces of waypoint information of the current cycle.

At step S8, vehicle No. 4 receives the waypoint information of the current cycle, compares the waypoint information with the 140 pieces of waypoint information stored in it, and stores one piece of new waypoint information if the new waypoint information is found. Vehicle No. 2 and vehicle No. 3 also simultaneously update the historical waypoint information stored in them. In this way, vehicle No. 2, vehicle No. 3 and vehicle No. 4 have the complete waypoint information of the leading vehicle.

Figure 6:
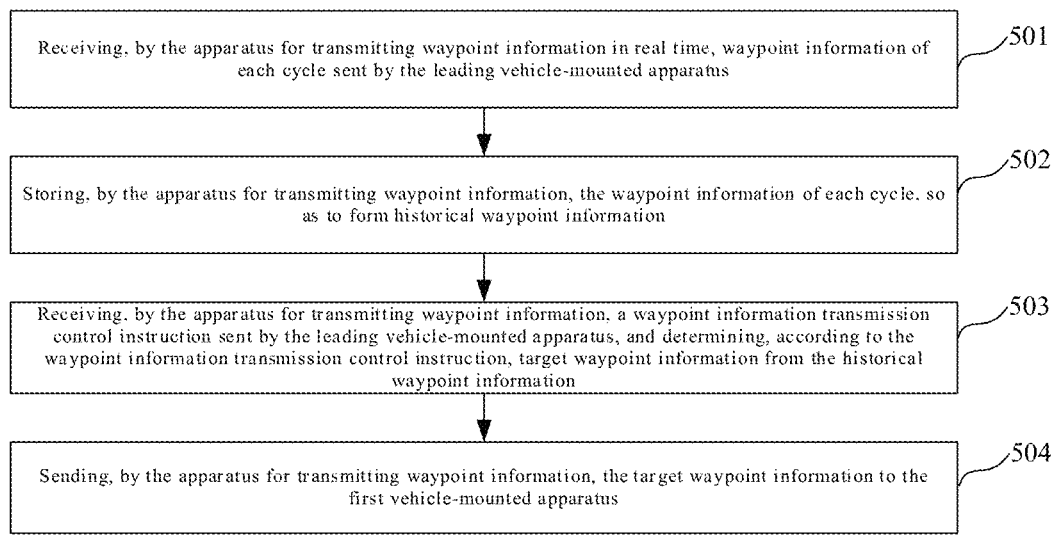
FIG. 6 is a flowchart of a method for transmitting waypoint information of a platooning in an embodiment of the present application.

In addition, as shown in FIG. 6, in one embodiment of the present application, a method for transmitting waypoint information of a platooning is provided, which is applied to a system for transmitting waypoint information of a platooning. The system comprises a leading vehicle-mounted apparatus, a first vehicle-mounted apparatus of a following vehicle to be enqueued, and an apparatus for transmitting waypoint information. The method comprises following steps:

Step 501, receiving, by the apparatus for transmitting waypoint information in real time, waypoint information of each cycle sent by the leading vehicle-mounted apparatus;

Step 502, storing, by the apparatus for transmitting waypoint information, the waypoint information of each cycle, so as to form historical waypoint information;

Step 503, receiving, by the apparatus for transmitting waypoint information, a waypoint information transmission control instruction sent by the leading vehicle-mounted apparatus, and determining, according to the waypoint information transmission control instruction, target waypoint information from the historical waypoint information; and Step 504, sending, by the apparatus for transmitting waypoint information, the target waypoint information to the first vehicle-mounted apparatus.

In one embodiment of the present application, the number of pieces of waypoint information of each cycle is the same. The waypoint information comprises a leading vehicle position and one or more pieces of the following information: a leading vehicle speed, a leading vehicle acceleration, a leading vehicle course, a steering angle of a front wheel of the leading vehicle, an opening degree of an accelerator of the leading vehicle, a depth of a brake pedal of the leading vehicle, a braking deceleration of the leading vehicle, and a rotating angle of a steering wheel of the leading vehicle.

In one embodiment of the present application, the step 502 that the apparatus for transmitting waypoint information stores the waypoint information of each cycle, so as to form historical waypoint information may be implemented by the following method:

The apparatus for transmitting waypoint information performs deduplication processing on the waypoint information of each cycle and stores the waypoint information of each cycle after the deduplication processing, so as to form the historical waypoint information.

In one embodiment of the present application, the waypoint information comprises a leading vehicle position, and the apparatus for transmitting waypoint information performs deduplication processing on the waypoint information of each cycle and stores the waypoint information of each cycle after the deduplication processing, so as to form the historical waypoint information by the following method:

The apparatus for transmitting waypoint information obtains a leading vehicle position corresponding to the waypoint information of the current cycle when it receives the waypoint information of the current cycle, compares the leading vehicle position corresponding to the waypoint information of the current cycle with the leading vehicle position corresponding to the waypoint information that has been stored to form a position comparison result, determines the waypoint information having the position comparison result less than or equal to a preset position deviation threshold as repeated waypoint information, deletes the repeated waypoint information from the waypoint information of the current cycle, and stores the remaining waypoint information of the current cycle after the deletion of the repeated waypoint information to form the historical waypoint information.

In one embodiment of the present application, the waypoint information comprises a waypoint information serial number, and the same waypoint information has the same waypoint information serial numbers. The apparatus for transmitting waypoint information performs deduplication processing on the waypoint information of each cycle and stores the waypoint information of each cycle after the deduplication processing, so as to form the historical waypoint information by the following method:

The apparatus for transmitting waypoint information obtains a waypoint information serial number corresponding to the waypoint information of the current cycle if it receives the waypoint information of the current cycle, compares the waypoint information serial number corresponding to the waypoint information of the current cycle with the waypoint information serial number corresponding to the waypoint information that has been stored to form a serial number comparison result, determines the waypoint information having the same serial number comparison result as repeated waypoint information, deletes the repeated waypoint information from the waypoint information of the current cycle, and stores the remaining waypoint information of the current cycle after the deletion of the repeated waypoint information to form the historical waypoint information.

In addition, in one embodiment of the present application, the apparatus for transmitting waypoint information is arranged on the leading vehicle, so that the apparatus for transmitting waypoint information is communicatively connected to the leading vehicle-mounted apparatus. The system for transmitting waypoint information of a platooning further comprises a leading vehicle redundant vehicle-mounted V2X device and a first vehicle-mounted V2X device of a following vehicle to be enqueued. The leading vehicle redundant vehicle-mounted V2X device is communicatively connected to the first vehicle-mounted V2X device. The apparatus for transmitting waypoint information is connected to the leading vehicle redundant vehicle-mounted V2X device. The first vehicle-mounted apparatus is connected to the first vehicle-mounted V2X device.

In the above step 504, the apparatus for transmitting waypoint information may send the target waypoint information to the first vehicle-mounted apparatus by the following method.

The apparatus for transmitting waypoint information sends the target waypoint information to the first vehicle-mounted apparatus through the leading vehicle redundant vehicle-mounted V2X device and the first vehicle-mounted V2X device.

In addition, in one embodiment of the present application, the apparatus for transmitting waypoint information is arranged on any following vehicle in the platooning. The system for transmitting waypoint information of a platooning further comprises a leading vehicle-mounted V2X device, a first vehicle-mounted V2X device of a following vehicle to be enqueued, and a second vehicle-mounted V2X device of a following vehicle where the apparatus for transmitting waypoint information is located. Every two of the leading vehicle-mounted V2X device, the first vehicle-mounted V2X device and the second vehicle-mounted V2X device are communicatively connected. The leading vehicle-mounted apparatus is connected to the leading vehicle-mounted V2X device. The first vehicle-mounted apparatus is connected to the first vehicle-mounted V2X device. The apparatus for transmitting waypoint information is connected to the second vehicle-mounted V2X device.

In the above step 501, the apparatus for transmitting waypoint information may receive, in real time, waypoint information of each cycle sent by the leading vehicle-mounted apparatus by the following method.

For example, the apparatus for transmitting waypoint information receives, through the second vehicle-mounted V2X device in real time, the waypoint information of each cycle sent by the leading vehicle-mounted apparatus through the leading vehicle-mounted V2X device.

In the above step 504, the apparatus for transmitting waypoint information may send the target waypoint information to the first vehicle-mounted apparatus by the following method.

For example, the apparatus for transmitting waypoint information sends the target waypoint information to the first vehicle-mounted apparatus through the second vehicle-mounted V2X device and the first vehicle-mounted V2X device.

In addition, in one embodiment of the present application, the apparatus for transmitting waypoint information is arranged on a following vehicle at the tail of the platooning.

In addition, in one embodiment of the present application, the apparatus for transmitting waypoint information is arranged on a RSU of a road where the platooning runs. The system for transmitting waypoint information of a platooning further comprises a leading vehicle-mounted V2X device, a first vehicle-mounted V2X device of a following vehicle to be enqueued, and a road side V2X device of the RSU where the apparatus for transmitting waypoint information is located. Every two of the leading vehicle-mounted V2X device, the first vehicle-mounted V2X device and the road side V2X device are communicatively connected. The leading vehicle-mounted apparatus is connected to the leading vehicle-mounted V2X device. The first vehicle-mounted apparatus is connected to the first vehicle-mounted V2X device. The apparatus for transmitting waypoint information is connected to the road side V2X device.

In the above step 501, the apparatus for transmitting waypoint information may receive, in real time, waypoint information of each cycle sent by the leading vehicle-mounted apparatus by the following method.

For example, the apparatus for transmitting waypoint information receives, through the road side V2X device in real time, the waypoint information of each cycle sent by the leading vehicle-mounted apparatus through the leading vehicle-mounted V2X device.

In the above step 504, the apparatus for transmitting waypoint information may send the target waypoint information to the first vehicle-mounted apparatus by the following method:

The apparatus for transmitting waypoint information sends the target waypoint information to the first vehicle-mounted apparatus through the road side V2X device and the first vehicle-mounted V2X device.

In addition, in one embodiment of the present application, the waypoint information transmission control instruction comprises a current position of the following vehicle to be enqueued and a current position of the leading vehicle. In the above step 503, the apparatus for transmitting waypoint information may receive a waypoint information transmission control instruction sent by the leading vehicle-mounted apparatus, and determine, according to the waypoint information transmission control instruction, the target waypoint information from the historical waypoint information by the following method.

For example, the apparatus for transmitting waypoint information receives the waypoint information transmission control instruction sent by the leading vehicle-mounted apparatus and obtains, according to the current position of the following vehicle to be enqueued in the waypoint information transmission control instruction, the target waypoint information between the current position of the following vehicle to be enqueued and the current position of the leading vehicle from the historical waypoint information.

It is noted that the specific implementation of the embodiment of the present application may refer to the embodiment of the system for transmitting waypoint information of a platooning corresponding to FIG. 1 to FIG. 5, and details will not be described again here.

Figure 7:
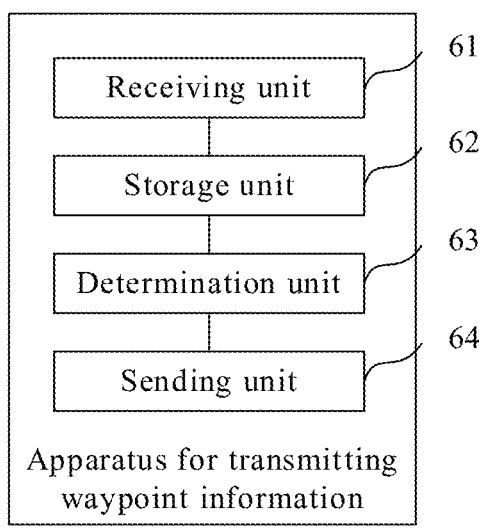
FIG. 7 is a schematic structural diagram of an apparatus for transmitting waypoint information according to an embodiment of the present application.

In addition, as shown in FIG. 7, an embodiment of the present application further provides an apparatus for transmitting waypoint information, which is applied to a system for transmitting waypoint information of a platooning. The system comprises a leading vehicle-mounted apparatus, a first vehicle-mounted apparatus of a following vehicle to be enqueued, and an apparatus for transmitting waypoint information. The apparatus for transmitting waypoint information comprises: a receiving unit 61, configured for receiving waypoint information of each cycle sent by the leading vehicle-mounted apparatus in real time; a storage unit 62, configured for storing the waypoint information of each cycle, so as to form historical waypoint information; a determination unit 63, configured for receiving a waypoint information transmission control instruction sent by the leading vehicle-mounted apparatus, and determining, according to the waypoint information transmission control instruction, target waypoint information from the historical waypoint information; and a sending unit 64, configured for sending the target waypoint information to the first vehicle-mounted apparatus.

The specific implementation of the embodiment of the present application may refer to the embodiment of the system for transmitting waypoint information of a platooning corresponding to FIG. 1 to FIG. 5, and details will not be described again here.

In addition, an embodiment of the present application further provides a computer-readable storage medium on which a computer program is stored. The program, when executed by a processor, implements the method for transmitting waypoint information of a platooning corresponding to FIG. 6. The specific implementation of the apparatus may refer to the embodiment of the system for transmitting waypoint information of a platooning corresponding to FIG. 1 to FIG. 5, and details will not be described again here.

In addition, an embodiment of the present application further provides a computer program product comprising an instruction. The computer program product, when operated on a computer, causes the computer to execute the method for transmitting waypoint information of a platooning corresponding to FIG. 6. The specific implementation of the apparatus may refer to the embodiment of the system for transmitting waypoint information of a platooning corresponding to FIG. 1 to FIG. 5, and details will not be described again here.

In addition, an embodiment of the present application further provides a chip system comprising a processor. The processor is coupled to a memory, and the memory stores a program instruction. The program instruction stored in the memory, when executed by the processor, implements the method for transmitting waypoint information of a platooning corresponding to FIG. 6. The specific implementation of the apparatus may refer to the embodiment of the system for transmitting waypoint information of a platooning corresponding to FIG. 1 to FIG. 5, and details will not be described again here.

In addition, an embodiment of the present application further provides a circuitry comprising a processing circuit configured to implement the method for transmitting waypoint information for a platooning corresponding to FIG. 6. The specific implementation of the apparatus may refer to the embodiment of the system for transmitting waypoint information of a platooning corresponding to FIG. 1 to FIG. 5, and details will not be described again here.

In addition, an embodiment of the present application further provides a computer server comprising a memory and one or more processors communicatively connected to the memory.

The memory stores instructions executable by the one or more processors. The instructions, when executed by the one or more processors, cause the one or more processors to implement the method for transmitting waypoint information of a platooning corresponding to FIG. 6. The specific implementation of the apparatus may refer to the embodiment of the system for transmitting waypoint information of a platooning corresponding to FIG. 1 to FIG. 5, and details will not be described again here.

The embodiments of the present application provide a method, apparatus and system for transmitting waypoint information of a platooning. The apparatus for transmitting waypoint information receives, in real time, waypoint information of each cycle sent by the leading vehicle-mounted apparatus, stores the waypoint information of each cycle, so as to form historical waypoint information, receives a waypoint information transmission control instruction sent by the leading vehicle-mounted apparatus, determines, according to the waypoint information transmission control instruction, target waypoint information from the historical waypoint information, and sends the target waypoint information to the first vehicle-mounted apparatus. It is thus clear that the waypoint information of each cycle of the leading vehicle in the embodiments of the present application is stored and maintained by the apparatus for transmitting waypoint information alone. If there is a following vehicle to be enqueued, the apparatus for transmitting waypoint information is used for determining the target waypoint information and sending it to the first vehicle-mounted apparatus of the following vehicle to be enqueued, and the leading vehicle-mounted apparatus only sends less waypoint information at each cycle, instead of sending a mass of waypoint information if there is a following vehicle to be enqueued, thus saving the communication resources of the leading vehicle, and the problem that the communication resources of the leading vehicle are excessively occupied can be avoided.

Additional features and embodiments of the above-described methods/techniques are described below using a clause-based description format.

1. A method for transmitting waypoint information of a platooning, which is applied to a system for transmitting waypoint information of a platooning, wherein the system comprises a leading vehicle-mounted apparatus, a first vehicle-mounted apparatus of a following vehicle to be enqueued, and an apparatus for transmitting waypoint information; the method comprises: receiving, by the apparatus for transmitting waypoint information in real time, waypoint information of each cycle sent by the leading vehicle-mounted apparatus; storing, by the apparatus for transmitting waypoint information, the waypoint information of each cycle, so as to form historical waypoint information; receiving, by the apparatus for transmitting waypoint information, a waypoint information transmission control instruction sent by the leading vehicle-mounted apparatus, and determining, according to the waypoint information transmission control instruction, target waypoint information from the historical waypoint information; and sending, by the apparatus for transmitting waypoint information, the target waypoint information to the first vehicle-mounted apparatus.

2. The method for transmitting waypoint information of a platooning according to clause 1, wherein the number of pieces of waypoint information of each cycle is the same; the waypoint information comprises a leading vehicle position and one or more pieces of the following information: a leading vehicle speed, a leading vehicle acceleration, a leading vehicle course, a steering angle of a front wheel of the leading vehicle, an opening degree of an accelerator of the leading vehicle, a depth of a brake pedal of the leading vehicle, a braking deceleration of the leading vehicle, and a rotating angle of a steering wheel of the leading vehicle.

3. The method for transmitting waypoint information of a platooning according to clause 1, wherein the storing, by the apparatus for transmitting waypoint information, the waypoint information of each cycle, so as to form historical waypoint information comprises: performing, by the apparatus for transmitting waypoint information, deduplication processing on the waypoint information of each cycle, and storing the waypoint information of each cycle after the deduplication processing, so as to form the historical waypoint information.

4. The method for transmitting waypoint information of a platooning according to clause 3, wherein the waypoint information comprises a leading vehicle position; the performing, by the apparatus for transmitting waypoint information, deduplication processing on the waypoint information of each cycle, and storing the waypoint information of each cycle after the deduplication processing, so as to form the historical waypoint information comprises: obtaining, by the apparatus for transmitting waypoint information, a leading vehicle position corresponding to waypoint information of a current cycle when the apparatus for transmitting waypoint information receives the waypoint information of the current cycle; comparing, by the apparatus for transmitting waypoint information, the leading vehicle position corresponding to the waypoint information of the current cycle with a leading vehicle position corresponding to the waypoint information that has been stored to form a position comparison result; determining, by the apparatus for transmitting waypoint information, the waypoint information having the position comparison result less than or equal to a preset position deviation threshold as repeated waypoint information, deleting the repeated waypoint information from the waypoint information of the current cycle, and storing the remaining waypoint information of the current cycle after the deletion of the repeated waypoint information to form the historical waypoint information.

5. The method for transmitting waypoint information of a platooning according to clause 3, wherein the waypoint information comprises a waypoint information serial number, and the same waypoint information has the same waypoint information serial numbers; the performing, by the apparatus for transmitting waypoint information, deduplication processing on the waypoint information of each cycle, and storing the waypoint information of each cycle after the deduplication processing, so as to form the historical waypoint information comprises: obtaining, by the apparatus for transmitting waypoint information, a waypoint information serial number corresponding to waypoint information of a current cycle when the apparatus for transmitting waypoint information receives the waypoint information of the current cycle; comparing, by the apparatus for transmitting waypoint information, the waypoint information serial number corresponding to the waypoint information of the current cycle with a waypoint information serial number corresponding to the waypoint information that has been stored to form a serial number comparison result; determining, by the apparatus for transmitting waypoint information, the waypoint information having the same serial number comparison result as repeated waypoint information, deleting the repeated waypoint information from the waypoint information of the current cycle, and storing the remaining waypoint information of the current cycle after the deletion of the repeated waypoint information to form the historical waypoint information.

6. The method for transmitting waypoint information of a platooning according to clause 1, wherein the apparatus for transmitting waypoint information is arranged on the leading vehicle, so that the apparatus for transmitting waypoint information is communicatively connected to the leading vehicle-mounted apparatus; the system for transmitting waypoint information of a platooning further comprises a leading vehicle redundant vehicle-mounted V2X device and a first vehicle-mounted V2X device of a following vehicle to be enqueued; the leading vehicle redundant vehicle-mounted V2X device is communicatively connected to the first vehicle-mounted V2X device; the apparatus for transmitting waypoint information is connected to the leading vehicle redundant vehicle-mounted V2X device; the first vehicle-mounted apparatus is connected to the first vehicle-mounted V2X device; the sending, by the apparatus for transmitting waypoint information, the target waypoint information to the first vehicle-mounted apparatus comprises: sending, by the apparatus for transmitting waypoint information, the target waypoint information to the first vehicle-mounted apparatus through the leading vehicle redundant vehicle-mounted V2X device and the first vehicle-mounted V2X device.

7. The method for transmitting waypoint information of a platooning according to clause 1, wherein the apparatus for transmitting waypoint information is arranged on any following vehicle in the platooning; the system for transmitting waypoint information of a platooning further comprises a leading vehicle-mounted V2X device, a first vehicle-mounted V2X device of a following vehicle to be enqueued, and a second vehicle-mounted V2X device of a following vehicle where the apparatus for transmitting waypoint information is located; every two of the leading vehicle-mounted V2X device, the first vehicle-mounted V2X device and the second vehicle-mounted V2X device are communicatively connected; the leading vehicle-mounted apparatus is connected to the leading vehicle-mounted V2X device; the first vehicle-mounted apparatus is connected to the first vehicle-mounted V2X device; the apparatus for transmitting waypoint information is connected to the second vehicle-mounted V2X device; the receiving, by the apparatus for transmitting waypoint information in real time, waypoint information of each cycle sent by the leading vehicle-mounted apparatus comprises: receiving, by the apparatus for transmitting waypoint information through the second vehicle-mounted V2X device in real time, the waypoint information of each cycle sent by the leading vehicle-mounted apparatus through the leading vehicle-mounted V2X device; the sending, by the apparatus for transmitting waypoint information, the target waypoint information to the first vehicle-mounted apparatus comprises: sending, by the apparatus for transmitting waypoint information, the target waypoint information to the first vehicle-mounted apparatus through the second vehicle-mounted V2X device and the first vehicle-mounted V2X device.

8. The method for transmitting waypoint information of a platooning according to clause 7, wherein the apparatus for transmitting waypoint information is arranged on a following vehicle at the tail of the platooning.

9. The method for transmitting waypoint information of a platooning according to clause 1, wherein the apparatus for transmitting waypoint information is arranged on a road side unit (RSU) of a road where the platooning runs; the system for transmitting waypoint information of a platooning further comprises a leading vehicle-mounted V2X device, a first vehicle-mounted V2X device of a following vehicle to be enqueued, and a road side V2X device of the RSU where the apparatus for transmitting waypoint information is located; every two of the leading vehicle-mounted V2X device, the first vehicle-mounted V2X device and the road side V2X device are communicatively connected; the leading vehicle-mounted apparatus is connected to the leading vehicle-mounted V2X device; the first vehicle-mounted apparatus is connected to the first vehicle-mounted V2X device; the apparatus for transmitting waypoint information is connected to the road side V2X device; the receiving, by the apparatus for transmitting waypoint information in real time, waypoint information of each cycle sent by the leading vehicle-mounted apparatus comprises: receiving, by the apparatus for transmitting waypoint information through the road side V2X device in real time, the waypoint information of each cycle sent by the leading vehicle-mounted apparatus through the leading vehicle-mounted V2X device; the sending, by the apparatus for transmitting waypoint information, the target waypoint information to the first vehicle-mounted apparatus comprises: sending, by the apparatus for transmitting waypoint information, the target waypoint information to the first vehicle-mounted apparatus through the road side V2X device and the first vehicle-mounted V2X device.

10. The method for transmitting waypoint information of a platooning according to clause 1, wherein the waypoint information transmission control instruction comprises a current position of the following vehicle to be enqueued and a current position of the leading vehicle; the receiving, by the apparatus for transmitting waypoint information, a waypoint information transmission control instruction sent by the leading vehicle-mounted apparatus, and determining, according to the waypoint information transmission control instruction, target waypoint information from the historical waypoint information comprises: receiving, by the apparatus for transmitting waypoint information, the waypoint information transmission control instruction sent by the leading vehicle-mounted apparatus, and obtaining, according to the current position of the following vehicle to be enqueued in the waypoint information transmission control instruction, the target waypoint information between the current position of the following vehicle to be enqueued and the current position of the leading vehicle from the historical waypoint information.

11. An apparatus for transmitting waypoint information, which is applied to a system for transmitting waypoint information of a platooning, wherein the system comprises a leading vehicle-mounted apparatus, a first vehicle-mounted apparatus of a following vehicle to be enqueued, and an apparatus for transmitting waypoint information; the apparatus for transmitting waypoint information comprises: a receiving unit, configured for receiving waypoint information of each cycle sent by the leading vehicle-mounted apparatus in real time; a storage unit, configured for storing the waypoint information of each cycle, so as to form historical waypoint information; a determination unit, configured for receiving a waypoint information transmission control instruction sent by the leading vehicle-mounted apparatus, and determining, according to the waypoint information transmission control instruction, target waypoint information from the historical waypoint information; and a sending unit, configured for sending the target waypoint information to the first vehicle-mounted apparatus.

12. A system for transmitting waypoint information of a platooning, wherein the system comprises a leading vehicle-mounted apparatus, a first vehicle-mounted apparatus of a following vehicle to be enqueued, and an apparatus for transmitting waypoint information; the leading vehicle-mounted apparatus is configured for sending waypoint information of a current cycle to the apparatus for transmitting waypoint information in real time; the apparatus for transmitting waypoint information is configured for receiving the waypoint information of each cycle in real time and storing the waypoint information of each cycle, so as to form historical waypoint information; the leading vehicle-mounted apparatus is further configured for sending a waypoint information transmission control instruction to the apparatus for transmitting waypoint information; the apparatus for transmitting waypoint information is further configured for determining, according to the waypoint information transmission control instruction, target waypoint information from the historical waypoint information, and sending the target waypoint information to the first vehicle-mounted apparatus.

13. The system for transmitting waypoint information of a platooning according to clause 12, wherein the number of pieces of waypoint information of each cycle is the same; and the waypoint information comprises a leading vehicle position and one or more pieces of the following information: a leading vehicle speed, a leading vehicle acceleration, a leading vehicle course, a steering angle of a front wheel of the leading vehicle, an opening degree of an accelerator of the leading vehicle, a depth of a brake pedal of the leading vehicle, a braking deceleration of the leading vehicle, and a rotating angle of a steering wheel of the leading vehicle.

14. The system for transmitting waypoint information of a platooning according to clause 12, wherein the apparatus for transmitting waypoint information is specifically configured for: performing deduplication processing on the waypoint information of each cycle, and storing the waypoint information of each cycle after the deduplication processing, so as to form the historical waypoint information.

15. The system for transmitting waypoint information of a platooning according to clause 14, wherein the waypoint information comprises a leading vehicle position; the apparatus for transmitting waypoint information is specifically configured for: obtaining a leading vehicle position corresponding to the waypoint information of the current cycle when receiving the waypoint information of the current cycle; comparing the leading vehicle position corresponding to the waypoint information of the current cycle with a leading vehicle position corresponding to the waypoint information that has been stored to form a position comparison result; and determining the waypoint information having the position comparison result less than or equal to a preset position deviation threshold as repeated waypoint information, deleting the repeated waypoint information from the waypoint information of the current cycle, and storing the remaining waypoint information of the current cycle after the deletion of the repeated waypoint information to form the historical waypoint information.

16. The system for transmitting waypoint information of a platooning according to clause 14, wherein the waypoint information comprises a waypoint information serial number, and the same waypoint information has the same waypoint information serial numbers; the apparatus for transmitting waypoint information is specifically configured for: obtaining a waypoint information serial number corresponding to the waypoint information of the current cycle when receiving the waypoint information of the current cycle; comparing the waypoint information serial number corresponding to the waypoint information of the current cycle with a waypoint information serial number corresponding to the waypoint information that has been stored to form a serial number comparison result; and determining the waypoint information having the same serial number comparison result as repeated waypoint information, deleting the repeated waypoint information from the waypoint information of the current cycle, and storing the remaining waypoint information of the current cycle after the deletion of the repeated waypoint information to form the historical waypoint information.

17. The system for transmitting waypoint information of a platooning according to clause 12, wherein the apparatus for transmitting waypoint information is arranged on the leading vehicle, so that the apparatus for transmitting waypoint information is communicatively connected to the leading vehicle-mounted apparatus; the system for transmitting waypoint information of a platooning further comprises a leading vehicle redundant vehicle-mounted V2X device and a first vehicle-mounted V2X device of a following vehicle to be enqueued; the leading vehicle redundant vehicle-mounted V2X device is communicatively connected to the first vehicle-mounted V2X device; the apparatus for transmitting waypoint information is connected to the leading vehicle redundant vehicle-mounted V2X device; the first vehicle-mounted apparatus is connected to the first vehicle-mounted V2X device; the apparatus for transmitting waypoint information is specifically configured for: sending the target waypoint information to the first vehicle-mounted apparatus through the leading vehicle redundant vehicle-mounted V2X device and the first vehicle-mounted V2X device.

18. The system for transmitting waypoint information of a platooning according to clause 12, wherein the apparatus for transmitting waypoint information is arranged on any following vehicle in the platooning; the system for transmitting waypoint information of a platooning further comprises a leading vehicle-mounted V2X device, a first vehicle-mounted V2X device of a following vehicle to be enqueued, and a second vehicle-mounted V2X device of a following vehicle where the apparatus for transmitting waypoint information is located; every two of the leading vehicle-mounted V2X device, the first vehicle-mounted V2X device and the second vehicle-mounted V2X device are communicatively connected; the leading vehicle-mounted apparatus is connected to the leading vehicle-mounted V2X device; the first vehicle-mounted apparatus is connected to the first vehicle-mounted V2X device; the apparatus for transmitting waypoint information is connected to the second vehicle-mounted V2X device; the apparatus for transmitting waypoint information is specifically configured for: receiving, through the second vehicle-mounted V2X device in real time, the waypoint information of each cycle sent by the leading vehicle-mounted apparatus through the leading vehicle-mounted V2X device; and sending the target waypoint information to the first vehicle-mounted apparatus through the second vehicle-mounted V2X device and the first vehicle-mounted V2X device.

19. The system for transmitting waypoint information of a platooning according to clause 18, wherein the apparatus for transmitting waypoint information is arranged on a following vehicle at the tail of the platooning.

20. The system for transmitting waypoint information of a platooning according to clause 12, wherein the apparatus for transmitting waypoint information is arranged on a road side unit (RSU) of a road where the platooning runs; the system for transmitting waypoint information of a platooning further comprises a leading vehicle-mounted V2X device, a first vehicle-mounted V2X device of a following vehicle to be enqueued, and a road side V2X device of the RSU where the apparatus for transmitting waypoint information is located; every two of the leading vehicle-mounted V2X device, the first vehicle-mounted V2X device and the road side V2X device are communicatively connected; the leading vehicle-mounted apparatus is connected to the leading vehicle-mounted V2X device; the first vehicle-mounted apparatus is connected to the first vehicle-mounted V2X device; the apparatus for transmitting waypoint information is connected to the road side V2X device; the apparatus for transmitting waypoint information is specifically configured for: receiving, through the road side V2X device in real time, the waypoint information of each cycle sent by the leading vehicle-mounted apparatus through the leading vehicle-mounted V2X device; and sending the target waypoint information to the first vehicle-mounted apparatus through the road side V2X device and the first vehicle-mounted V2X device.

21. The system for transmitting waypoint information of a platooning according to clause 12, wherein the waypoint information transmission control instruction comprises a current position of the following vehicle to be enqueued and a current position of the leading vehicle; the apparatus for transmitting waypoint information is specifically configured for: receiving the waypoint information transmission control instruction sent by the leading vehicle-mounted apparatus, and obtaining, according to the current position of the following vehicle to be enqueued in the waypoint information transmission control instruction, the target waypoint information between the current position of the following vehicle to be enqueued and the current position of the leading vehicle from the historical waypoint information.

22. A computer-readable storage medium, comprising a program or an instruction, wherein the program or the instruction, when operated on a computer, implements the method for transmitting waypoint information of a platooning according to any one of clauses 1 to 10.

23. A computer program product comprising an instruction, wherein the computer program product, when operated on a computer, causes the computer to execute the method for transmitting waypoint information of a platooning according to any one of clauses 1 to 10.

24. A chip system comprising a processor, wherein the processor is coupled to a memory, and the memory stores a program instruction; the program instruction stored in the memory, when executed by the processor, implements the method for transmitting waypoint information of a platooning according to any one of clauses 1 to 10.

25. A circuitry, comprising a processing circuit, wherein the processing circuit is configured to execute the method for transmitting waypoint information of a platooning according to any one of clauses 1 to 10.

26. A computer server, comprising a memory, and one or more processors communicatively connected to the memory, wherein the memory stores instructions executable by the one or more processors; the instructions, when executed by the one or more processors, cause the one or more processors to implement the method for transmitting waypoint information of a platooning according to any one of clauses 1 to 10.

It should be appreciated by those skilled in the art that embodiments of the present application may be provided as a method, a system, or a computer program product. Accordingly, the present application may take the forms of a hardware-only embodiment, a software-only embodiment or an embodiment combining software and hardware. Furthermore, the present application may take the form of a computer program product implemented on one or more computer-usable storage media (including, but not limited to, disk memory, CD-ROM, optical memory, and the like) containing computer-usable program codes.

The present application is described with reference to flowcharts and/or block diagrams of a method, a device (system), and a computer program product according to the present application. It should be understood that each procedure and/or block of the flowcharts and/or block diagrams, and a combination of procedures and/or blocks in the flowcharts and/or block diagrams, can be implemented by computer program instructions. These computer program instructions may be provided to a processor of a general purpose computer, a dedicated computer, an embedded processor or other programmable data processing devices to produce a machine, such that the instructions executed by the processor of the computer or other programmable data processing devices produce an apparatus for implementing the functions specified in one or more procedures in the flowcharts and/or one or more blocks of block diagrams.

These computer program instructions may also be stored in a computer-readable memory that can direct a computer or other programmable data processing devices to operate in a particular manner, such that the instructions stored in the computer-readable memory produce a product comprising an instruction apparatus which implements the functions specified in one or more procedures in the flowcharts and/or one or more blocks of block diagrams.

These computer program instructions may also be loaded onto a computer or other programmable data processing devices to allow a series of operation steps to be performed on the computer or other programmable devices to produce a computer implemented process, such that the instructions executed on the computer or other programmable device provide steps for implementing the functions specified in one or more procedures in the flowcharts and/or one or more blocks of block diagrams.

In the present application, specific embodiments are used to illustrate the principles and implementations of the present application, and the descriptions of the above embodiments are only used to help understand the method of the present application and the core idea of the method. Meanwhile, for those of ordinary skill in the art, the idea of the present application will have changes in the specific implementations and application scope. To sum up, the content of this specification should not be construed as a limitation on the present application.

What is claimed is:

1. A method comprising:
   receiving, by an apparatus for transmitting waypoint information in real time, waypoint information of each cycle sent by a leading vehicle-mounted apparatus mounted on a leading vehicle;
   storing, by the apparatus, the waypoint information of each cycle, so as to form historical waypoint information;
   receiving, by the apparatus, a waypoint information transmission control instruction sent by the leading vehicle-mounted apparatus, wherein the waypoint information transmission control instruction comprises a current position of the leading vehicle and a current position of a first following vehicle that is following the leading vehicle and that is to be enqueued for a platooning;
   determining, by the apparatus, according to the waypoint information transmission control instruction, target waypoint information between the current position of the leading vehicle and the current position of the first following vehicle, based on the historical waypoint information; and
   sending, by the apparatus, the target waypoint information to a first vehicle-mounted apparatus mounted on the first following vehicle through vehicle-to-everything (V2X) communication.

2. The method according to claim 1, wherein a number of pieces of the waypoint information of each cycle is same, and
   wherein the waypoint information comprises a leading vehicle position and one or more pieces of the following information: a leading vehicle speed, a leading vehicle acceleration, a leading vehicle course, a steering angle of a front wheel of the leading vehicle, an opening degree of an accelerator of the leading vehicle, a depth of a brake pedal of the leading vehicle, a braking deceleration of the leading vehicle, or a rotating angle of a steering wheel of the leading vehicle.

3. The method according to claim 1, further comprising, prior to the storing the waypoint information of each cycle, performing a deduplication processing on the waypoint information of each cycle prior to the storing the waypoint information.

4. The method according to claim 3,
   wherein the waypoint information comprises a leading vehicle position, and
   wherein the performing the deduplication processing comprises:
   obtaining the leading vehicle position corresponding to waypoint information of a current cycle upon receiving the waypoint information of the current cycle;
   comparing the leading vehicle position corresponding to the waypoint information of the current cycle with a leading vehicle position corresponding to the waypoint information that has been stored to form a position comparison result;
   determining the waypoint information having the position comparison result less than or equal to a preset position deviation threshold as repeated waypoint information, deleting the repeated waypoint information from the waypoint information of the current cycle, and storing the remaining waypoint information of the current cycle after the deletion of the repeated waypoint information to form the historical waypoint information.

5. The method according to claim 3,
   wherein the waypoint information comprises a waypoint information serial number that is same for a same waypoint information, and wherein the performing the deduplication processing comprises:
obtaining the waypoint information serial number corresponding to waypoint information of a current cycle upon receiving the waypoint information of the current cycle;
comparing the waypoint information serial number corresponding to the waypoint information of the current cycle with a waypoint information serial number corresponding to the waypoint information that has been stored to form a serial number comparison result;
determining the waypoint information having the same serial number comparison result as repeated waypoint information, deleting the repeated waypoint information from the waypoint information of the current cycle, and storing the remaining waypoint information of the current cycle after the deletion of the repeated waypoint information to form the historical waypoint information.

6. The method according to claim 1,
wherein the apparatus for transmitting waypoint information is arranged on the leading vehicle to be communicatively connected to the leading vehicle-mounted apparatus,
wherein the apparatus for transmitting waypoint information is connected to a leading vehicle-mounted V2X device mounted on the leading vehicle communicatively connected to a first vehicle-mounted V2X device connected to the first vehicle-mounted apparatus, and
wherein the target waypoint information is sent to the first vehicle-mounted apparatus comprises through the leading vehicle-mounted V2X device and the first vehicle-mounted V2X device.

7. The method according to claim 1,
wherein the apparatus for transmitting waypoint information is arranged on the first following vehicle comprising a first vehicle-mounted V2X device connected to the first vehicle-mounted apparatus or a second following vehicle including comprising a second vehicle-mounted V2X device connected to the second vehicle-mounted apparatus,
wherein the waypoint information of each cycle is received through a leading vehicle-mounted V2X device mounted on the leading vehicle to be connected to the leading vehicle-mounted apparatus,
wherein the target waypoint information is sent to the first vehicle-mounted apparatus through the second vehicle-mounted V2X device and the first vehicle-mounted V2X device, and
wherein two of the leading vehicle-mounted V2X device, the first vehicle-mounted V2X device and the second vehicle-mounted V2X device are communicatively connected.

8. The method according to claim 7, wherein the apparatus for transmitting waypoint information is arranged on a second following vehicle at a tail of the platooning.

9. The method according to claim 1,
wherein the apparatus for transmitting waypoint information is arranged on a road side unit (RSU) of a road where the platooning runs, the road side unit including comprising a road side V2X device,
wherein the waypoint information of each cycle is received through a leading vehicle-mounted V2X device mounted on the leading vehicle and connected to the leading vehicle-mounted apparatus,
wherein the target waypoint information is sent to a first vehicle-mounted apparatus mounted on the first following vehicle through the road side V2X device and the first vehicle-mounted V2X device, and
wherein two of the leading vehicle-mounted V2X device, the first vehicle-mounted V2X device, and the road side V2X device are communicatively connected.

10. A system, comprising:
a leading vehicle-mounted apparatus mounted on a leading vehicle and configured for sending, to an apparatus for transmitting waypoint information, waypoint information of a current cycle and a waypoint information transmission control instruction, wherein the waypoint information transmission control instruction comprises a current position of the leading vehicle and a current position of a first following vehicle that is following the leading vehicle and that is to be enqueued for a platooning;
a first vehicle-mounted apparatus mounted on the following vehicle; and
the apparatus for transmitting waypoint information configured for receiving the waypoint information of each cycle in real time and storing the waypoint information of each cycle so as to form historical waypoint information, and
wherein the apparatus for transmitting waypoint information is further configured for determining, according to the waypoint information transmission control instruction, target waypoint information between the current position of the leading vehicle and the current position of the first following vehicle, based on the historical waypoint information, and sending the target waypoint information to the first vehicle-mounted apparatus through Vehicle to X (V2X) communication.

11. The system according to claim 10, wherein the apparatus for transmitting waypoint information is specifically configured for performing deduplication processing on the waypoint information of each cycle, and storing the waypoint information of each cycle after the deduplication processing, so as to form the historical waypoint information.

12. The system according to claim 10,
wherein the apparatus for transmitting waypoint information is arranged on the leading vehicle to be communicatively connected to the leading vehicle-mounted apparatus,
wherein the apparatus for transmitting waypoint information is connected to a leading vehicle-mounted V2X device mounted on the leading vehicle communicatively connected to a first vehicle-mounted V2X device connected to the first vehicle-mounted apparatus, and
wherein the apparatus for transmitting waypoint information is further configured for sending the target waypoint information to the first vehicle-mounted apparatus through the leading vehicle-mounted V2X device and the first vehicle-mounted V2X device.

13. The system according to claim 10,
wherein the apparatus for transmitting waypoint information is arranged on the first following vehicle comprising a first vehicle-mounted V2X device connected to the first vehicle-mounted apparatus or a second following vehicle comprising a second vehicle-mounted V2X device connected to the second vehicle-mounted apparatus,
wherein the apparatus for transmitting waypoint information is further configured for:

receiving, through the second vehicle-mounted V2X device in real time, the waypoint information of each cycle through a leading vehicle-mounted V2X device; and sending the target waypoint information to the first vehicle-mounted apparatus through the second vehicle-mounted V2X device and the first vehicle-mounted V2X device.

14. The system according to claim 10,
wherein the apparatus for transmitting waypoint information is arranged on a road side unit (RSU) of a road where the platooning runs, the road side unit including comprising a road side V2X device, and
wherein the apparatus for transmitting waypoint information is further configured for:
receiving, through the road side V2X device in real time, the waypoint information of each cycle through a leading vehicle-mounted V2X device; and
sending the target waypoint information to the first vehicle-mounted apparatus through the road side V2X device and the first vehicle-mounted V2X device.

15. The system according to claim 10,
wherein the first following vehicle is configured to follow the leading vehicle according to the target waypoint information.

16. A non-transitory computer readable storage medium, having a computer program stored thereon, the computer program, when executed by a processor, causes the processor to:
receive waypoint information of each cycle sent by a leading vehicle-mounted apparatus mounted on a leading vehicle;
store the waypoint information of each cycle, so as to form historical waypoint information;
receive a waypoint information transmission control instruction sent by the leading vehicle-mounted apparatus, wherein the waypoint information transmission control instruction comprises a current position of the leading vehicle and a current position of a first following vehicle that is following the leading vehicle and to be enqueued for a platooning;
determine according to the waypoint information transmission control instruction, target waypoint information between the current position of the leading vehicle and the current position of the first following vehicle, based on the historical waypoint information; and
send the target waypoint information to a first vehicle-mounted apparatus mounted on the first following vehicle through Vehicle to X (V2X) communication.

17. The non-transitory computer readable storage medium according to claim 16,
wherein a number of pieces of the waypoint information of each cycle is same, and
wherein the waypoint information comprises a leading vehicle position and one or more pieces of the following information: a leading vehicle speed, a leading vehicle acceleration, a leading vehicle course, a steering angle of a front wheel of the leading vehicle, an opening degree of an accelerator of the leading vehicle, a depth of a brake pedal of the leading vehicle, a braking deceleration of the leading vehicle, or a rotating angle of a steering wheel of the leading vehicle.

18. The non-transitory computer readable storage medium according to claim 16, wherein the computer program, when executed by a processor, causes the processor further to, perform a deduplication processing on the waypoint information of each cycle.

19. The non-transitory computer readable storage medium according to claim 18,
wherein the waypoint information comprises a leading vehicle position, and
wherein the computer program, when executed by a processor, causes the processor further to:
obtain the leading vehicle position corresponding to waypoint information of a current cycle upon receiving the waypoint information of the current cycle;
compare the leading vehicle position corresponding to the waypoint information of the current cycle with a leading vehicle position corresponding to the waypoint information that has been stored to form a position comparison result;
determine the waypoint information having the position comparison result less than or equal to a preset position deviation threshold as repeated waypoint information, delete the repeated waypoint information from the waypoint information of the current cycle, and store the remaining waypoint information of the current cycle after the deletion of the repeated waypoint information to form the historical waypoint information.

20. The non-transitory computer readable storage medium according to claim 18,
wherein the waypoint information comprises a waypoint information serial number that is same for a same waypoint information, and
wherein the computer program, when executed by a processor, causes the processor further to:
obtain the waypoint information serial number corresponding to the waypoint information of the current cycle upon receiving the waypoint information of the current cycle;
compare the waypoint information serial number corresponding to the waypoint information of the current cycle with a waypoint information serial number corresponding to the waypoint information that has been stored to form a serial number comparison result; and
determine the waypoint information having the same serial number comparison result as repeated waypoint information, delete the repeated waypoint information from the waypoint information of the current cycle, and store the remaining waypoint information of the current cycle after the deletion of the repeated waypoint information to form the historical waypoint information.

* * * * *